Sept. 18, 1962  H. D. MYERS ET AL  3,054,691
METHOD OF MAKING A COATED FABRIC HAVING
A SUEDE-LIKE SURFACE
Filed June 4, 1958
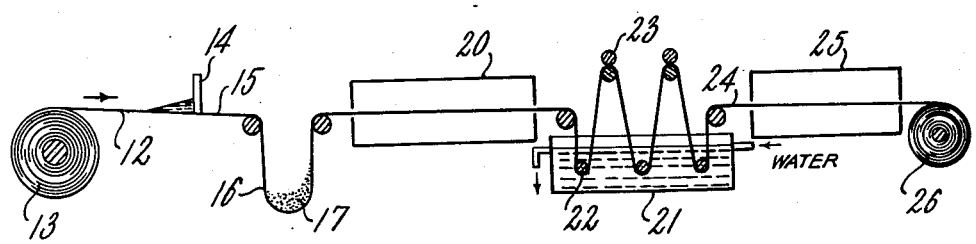
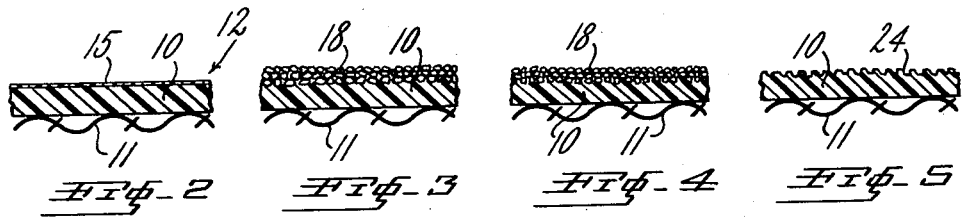
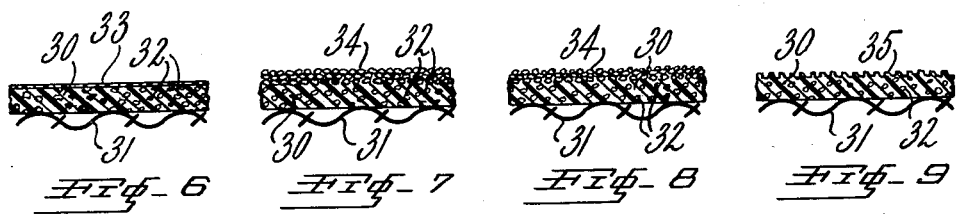
INVENTORS
HAROLD D. MEYERS
HAROLD T. NELSON
BY
James J. Long
AGENT United States Patent Office 3,054,691
Patented Sept. 18, 1962

3,054,691
METHOD OF MAKING A COATED FABRIC
HAVING A SUEDE-LIKE SURFACE
Harold D. Myers, Osceola, and Harold T. Nelson, Mishawaka, Ind., assignors to United States Rubber Company, New York, N.Y., a corporation of New Jersey
Filed June 4, 1958, Ser. No. 739,778
4 Claims. (Cl. 117—10)

This invention relates to a method of producing a suede-like texture or finish on the surface of an article comprising a thermoplastic resin.

The invention involves wetting the surface of a thermoplastic resinous article with a plasticizer, applying water-soluble particulate material, heating, and thereafter washing off the water-soluble material.

While various methods of decorating or texturizing the surface of articles made of thermoplastic resin, such as vinyl coated fabrics, have heretofore been proposed, there has not been available to the art, insofar as the present inventors are aware, any entirely satisfactory method for conveniently and economically producing on such articles a suede-like surface that is uniform and pleasing in appearance and to the touch.

One object of the invention, therefore, is to impart a suede-like texture to the surface of an article made of thermoplastic resin.

Another object is to provide a supported vinyl resin film having a suede-like surface texture.

Still a further object of the invention is to provide a fabric coated with a thermoplastic film of plasticized vinyl chloride resin, that is porous and that has a suede-like surface texture, and that is suitable for use in clothing or the like.

The manner in which the invention accomplishes the foregoing, as well as additional objects and advantages, will be made manifest in the following detailed description, which is intended to be read with reference to the accompanying drawings, wherein:

FIG. 1 is a purely diagrammatic representation of one arrangement of apparatus suitable for carrying out the method of the invention;

FIG. 2 is a fragmentary cross-sectional view, on an enlarged scale, of a plastic coated fabric having a film of liquid plasticizer applied thereto in accordance with the invention;

FIGS. 3–5 are similar views representing subsequent stages of the process; and

FIGS. 6–9 are similar views involving a modified process for producing porous coated fabric.

In accordance with the invention, there is applied to the surface of the thermoplastic resin article, on which it is desired to produce a suede-like texture, a film of a liquid plasticizer for the resin. The surface to which such plasticizer is applied may be in the first instance a plain, smooth surface, or it may have a previously produced mat finish, or it may even be embossed with a light grain, by any suitable conventional method. The thin film of plasticizer may be applied by any desired method, for example by means of conventional lacquering or spreading equipment (e.g., brush, felt knife, metal drag knife or by printing). The plasticizer may be any plasticizer conventionally used for thermoplastic resins, such as, for example, dioctyl phthalate, dicapryl phthalate, epoxidized soy bean oil, or the socalled polymeric plasticizers normally used in vinyl resins. Other conventional plasticizers for vinyl resins or other thermoplastic resins that may be mentioned by way of non-limiting example include butyl benzyl phthalate, dibutoxyethyl phthalate, adipates, azelates and other esters of polymethylene dicarboxylic acids such as dinonyl adipate, dioctyl azelate and the like, glycolic acid derivatives such as methyl phthalyl ethyl glycolate, triphenyl phosphate, and fatty acid derivatives such as butyl acetyl ricinoleate, as well as the low molecular weight polycarboxylic acid-polyhydric alcohol condensates. Any mixture of the foregoing plasticizers may be used, and high-boiling solvents (e.g. diisobutyl ketone, cyclohexanone, xylol) may also be added to the plasticizer or mixture of plasticizers, if desired.

After the application of the plasticizer to the surface of the thermoplastic vinyl article, a particulate water-soluble material is sprinkled onto or otherwise applied evenly over the wet surface. The water-soluble material may be any substance that is not deleterious to or reactive with the resin or the plasticizer, and that does not fuse, decompose or volatilize at the temperature of the subsequent heat step (to be described), i.e., the particulate material is inert and stable under the conditions of the present process. Inorganic materials, such as salts, e.g., metal salts such as sodium or potassium chloride or sulfate, ammonium sulfate, etc., are particularly suitable. The particle size of the material may vary, depending on whether it is desired to produce a very fine texture or a relatively coarse texture on the surface. A particle size between 60 and 180 mesh is the preferred size and produces a surface texture closely resembling suede leather in appearance. However, other particle sizes, such as 20 to 250 mesh, may also be used. When the particulate material is spread or sprinkled or otherwise applied to the surface of the thermoplastic material, such surface, being wet with the previously applied plasticizer, adheres to and accumulates a thin layer of the particulate material. This covering of particulate material is more than one particle deep, typically several particles or more deep.

The next step in the process of the invention involves subjecting the thermoplastic resin article, bearing the layer or film of particulate material on its wetted surface, to an elevated temperature sufficient to soften such surface. When the resin is thus heat-softened at the surface, the particulate material sinks into the surface. When the resin is thus heat softened or fused at the surface, the particulate material tends to be wetted by and to sink into the surface of the resin, becoming partially embedded therein, each particle thus making an impression or small pit on the surface. Some of the particles may sink completely into the softened resin, but in general all such sunken particles will be in contact with adjacent particles which are not submerged. This sinking or embedding of the particles in the resin surface is of course not purely gravitational, but is just as much a wetting or capillary or surface phenomenon. The temperature to which the surface of the thermoplastic article is heated for this purpose depends on the softening temperature of the resin. It is believed that a part of the plasticizer is absorbed into the resin, a part is volatilized by the heat, a part remains on salt and resin surfaces to be physically washed off in the leaching process. The plasticizer not only serves the original purpose of wetting the surface of the plastic so that the particulate material will adhere, but at this stage it also serves the purpose of lowering the softening point of the plastic (by being absorbed into the plastic), thereby permitting the particulate material to sink into the surface of the plastic more easily. The plasticizer also influences the final surface texture or feel, that is, increasing amounts of plasticizer give greater softness and more drag. With the usual thermoplastic resins, such as vinyl resin, surface temperatures of at least about 325° F., and preferably at least about 350° F. are suitable at this stage. Higher temperatures, e.g., 375 or 400° F., may be employed, although it is preferred not to exceed a temperature of about 425° F. for appreciable lengths of time, as there is danger of injuring the vinyl resin at such temperatures. The heat may be applied in any convenient manner, such as by radiation (e.g., electrical infra-red lamps), or by passing the vinyl film or the like through an oven.

It is not necessary nor desirable to apply pressure (e.g., by squeeze rolls or the like) to the layer of particulate material either before, during or after the heating step, it being important that the original distribution of the particles be not disturbed in any way.

After the described fusion step has been completed the thermoplastic article is washed with water to remove the particlate material, and then dried. The surface retains the impression left by the particles, which impression will closely duplicate a suede-like appearance and feel, provided the method has been carried out as directed. The particles of course retain their individual identity up to the final washing step, that is, they are insoluble in the plasticizer and the resin.

The invention is particularly applicable to articles made from vinyl resin, and especially to vinyl coated sheet material, such as vinyl coated fabric. The vinyl resin employed for this purpose may be any conventional resinous vinyl chloride polymer, whether polyvinyl chloride itself or a copolymer of vinyl chloride with a minor proportion, e.g., 3 to 40%, of one or more copolymerizable monomers (usually monoethylenically unsaturated materials), such as vinylidene chloride, vinyl acetate, diethyl maleate, etc. The vinyl resin may be compounded in any suitable conventional manner, for example with the usual quantities of plasticizer, pigments or fillers, stabilizers, processing aids, lubricants, etc. Other resins or elastomeric materials may be blended with the vinyl resin, in accordance with known practice.

The vinyl resin may be formed into a sheet or film, or coated onto a fabric or net or other backing by any conventional method, such as by the well known plastisol technique, or by calendering. As is well known, vinyl sheet or film formed by such conventional methods is subjected to fusion temperatures during the processing, with the result that the resin becomes homogeneous and forms upon cooling a strong, continuous solid phase. Such fusion temperature is conventionally either applied at the calender, or, in the case of plastisols, fusion is effected after the film is laid down from the fluid plastisol. The plasticizer becomes dissolved in the resin in the course of such processing. The resin may be laminated onto a metal backing, for example by the method shown in U.S. Patent 2,728,703, Kiernan et al., December 27, 1955. The resin may be fabricated into shaped articles such as footwear and the like, by known techniques, which articles may thereafter be treated on their exterior surface by the method of the invention, as described.

Another thermoplastic resin composition that may be used in the invention, especially in the form of a flexible film or sheet, preferably with a fabric backing, is represented by the known mixtures of rubbers, such as rubbery butadiene:acrylonitrile copolymers, with resins such as styrene:acrylonitrile resin, with or without additional polyvinyl chloride or other resins, plasticizers, etc. Similar mixtures including graft polymers (e.g., a graft polymer of styrene and acrylonitrile on a previously prepared latex of polybutadiene or rubbery butadiene copolymer) may be used.

The backing of fabric or the like performs an important function in the present process in that it supports and maintains the film of resin while the resin is being subjected to the surface fusion step. The backing not only prevents distortion and disruption of the vinyl resin while it is being heated, but it also makes it possible to carry out the process in a continuous fashion, by serving as a carrier means for advancing the resin through the various stages of the process. Considerable tension may be applied to the coated fabric for the purpose of advancing the fabric relatively rapidly while it is being treated, without danger of rupture of the film, even though the plastic film is heated to quite a high temperature during the fusing step.

If desired, the vinyl resin sheet or similar body may be rendered porous by including a particulate water-soluble salt in the body of the resin when it is originally mixed and calendered. The final washing step of the present method will also serve to leach out the water soluble material contained in the body of the vinyl film, thus producing a film which not only has a suede-like surface texture imparted by the method of the invention, but in addition is also porous. It will be understood however that such leaching out of water-soluble material included in the original vinyl resin mix is in itself in no way effective for producing a suede-like texture. The suede-like texture is obtained only by applying to the preformed film (whether containing within its body a water-soluble salt or not) a surface coating of plasticizer, followed by a coating of particulate water-soluble material, followed by fusion of the surface, all as described in detail above.

The following examples, in which all parts are expressed by weight, will serve to illustrate the practice of the invention in more detail.

EXAMPLE 1

*Producing Suede-like Texture on Non-porous Vinyl Coated Fabric*

The following vinyl resin composition is mixed on a roll mill in accordance with conventional practice:

| | |
|---|---|
| Polyvinyl chloride resin | 100.00 |
| Plasticizer (e.g. dioctylphthalate) | 80.00 |
| Stabilizer (e.g. barium oleate) | 3.00 |
| Lubricant (e.g. calcium stearate) | 1.19 |
| Pigment (e.g. carbon black) | 10.00 |
| Loading (e.g. calcium carbonate) | 20.00 |
| | 214.19 |

Referring to the drawing, the vinyl resin composition is calendered in the form of a film 10 (FIGS. 2–4) onto the surface of a textile material 11, to provide a coated fabric 12 suitable for use in the invention. Such coated fabric may be fed continuously from a supply roll 13 (FIG. 1) past a doctor blade 14 which serves to apply a thin film 15 of plasticizer, viz, dioctyl phthalate to the upper surface of the vinyl plastic 10. The coated fabric 12 then passes into the form of a descending running loop 16 in the trough of which a pile 17 of sodium chloride of predominantly 80–180 mesh particle size is maintained. In this way a layer 18 of such salt is applied on top of the plasticizer layer. Thereafter the coated fabric passes into an oven 20 maintained at a temperature of about 400° F., the fabric requiring a period of about 2 to 3 minutes to traverse the length of the oven. This treatment causes the surface of the resin to soften, so that the particles of salt sink into the surface of the resin film 10 as shown in FIG. 4. After passing out of the oven, the coated fabric is next passed into a "padder," which includes a tank 21, through which water is run, and an arrangement of submerged guide rolls 22 and elevated squeeze rolls 23 which serve to wash and squeeze the coated fabric repeatedly as it advances, thereby leaching away the salt. Usually several such padders are employed in series (those subsequent to the first padder being identical to the one shown) to insure thorough washing and rinsing. Such removal of the salt leaves a surface 24 (FIG. 5) of suede-like texture on the surface of the plastic coating. The coated fabric may thereafter be passed through a dryer 25 (FIG. 1) and finally wound up into a roll 26.

EXAMPLE 2

*Producing Suede-like Texture on Porous Vinyl Coated Fabric*

A composition similar to that shown in Example 1 was prepared except that there was added to the resin composition in the first instance from 70 to 110 parts of a salt (such as sodium chloride, anhydrous sodium sulfate, hydrated sodium sulfate or ammonium sulfate) per 100 parts of the mixture shown in Example 1. (Cubic and rhombic forms of crystals may be used, as well as material that had been ground to produce irregular particles. Particles of irregular shape are preferred.) The particle size was 60 to 180 mesh. The compound was mixed in a suitable mixer (such as preblend mixer of the Hobart type) in the normal manner and thereafter fluxed in the normal manner on a mill or in a Banbury mixer (preferred), and then applied to a suitable base fabric by means of a normal calendering operation. At this stage the fabric has more or less the appearance represented in FIG. 6, that is, the coating 30 on the fabric 31 contains the embedded salt particles 32. These particles are present in such proportions and distribution that most of the particles are, at least at one point, in contact with another particle, and some of the particles contact either the undersurface or the exterior surface of the resin coating.

Thereafter, the coated fabric may be treated exactly as in Example 1, that is, a film 33 of plasticizer may be applied to the exterior surface of the plastic, followed by a coating 34 (FIG. 7) of water-soluble particles, after which the surface of the plastic is fluxed by heat to cause the water-soluble particles 34 to become embedded in the surface as shown in FIG. 8. The coated fabric is thereafter leached in water. This not only produces a suede-like texture 35 on the surface of the plastic as in Example 1, but, in addition, it also leaves the main body of the vinyl film 30 in a spongy or porous condition because the internal salt particles 32 have similarly been removed by the leaching. It will be understood that the water is able to dissolve such internal salt because the salt particles 32 for the most part touch each other, and some of them contact one surface or the other of the plastic film. Therefore the water is eventually enabled to contact and dissolve substantially all of the internal salt particles 32, leaving a network of interconnecting voids in the final, dried product. The resulting "breathable" coated fabric makes an excellent material for jackets and similar articles of clothing, footwear, upholstery, etc., which are especially attractive because of the suede-like surface texture.

Having thus described our invention, what we claim and desire to protect by Leters Patent is:

1. In a method of making a coated fabric having a coating of plasticized thermoplastic vinyl resin with a suede-like surface, wherein such suede-like surface is produced by incorporating water-soluble particulate material in the surface of the solid, preformed resin coating on the fabric and thereafter leaching out the particles with water to leave a suede-like appearance and feel on the surface, the improvement comprising applying to the dry-surface of the solid, plasticized, preformed vinyl resin film, prior to incorporation of said particulate material, a layer consisting of liquid plasticizer to wet the said surface, thereafter applying to the resulting wet surface the water-soluble particulate material, the particles adhering to the wet surface and forming a layer thereon, and thereafter heating the assembly to dissolve a portion of the said added plasticizer in the surface of the solid, preformed resin film whereby such surface becomes soft and the particles sink into the surface of such resin without application of pressure, the particles being inert and stable and insoluble in the resin and plasticizer, and remaining present as such until the said leaching step, a portion of the said added plasticizer remaining in the surface of said resin film and thereby enhancing the softness thereof.

2. A method as in claim 1, in which the said resin is a vinyl chloride resin.

3. A method as in claim 2, in which the said particulate material has a particle size from 60 to 180 mesh.

4. A method as in claim 3, in which the said particulate material is an inorganic salt.

References Cited in the file of this patent

UNITED STATES PATENTS

| | | |
|---|---|---|
| 2,506,165 | Mountcastle | May 2, 1950 |
| 2,663,663 | Weltman et al. | Dec. 22, 1953 |
| 2,790,727 | Hilborn | Apr. 30, 1957 |
| 2,809,900 | Sarbach | Oct. 15, 1957 |
| 2,826,509 | Sarbach | Mar. 11, 1958 |
| 2,835,607 | Segner | May 20, 1958 |
| 2,862,284 | Wiczer | Dec. 2, 1958 |
| 2,983,960 | Jilge | May 16, 1961 |

FOREIGN PATENTS

| | | |
|---|---|---|
| 418,140 | Great Britain | Oct. 22, 1934 |